(12) United States Patent
Chamdani et al.

(10) Patent No.: US 7,185,338 B2
(45) Date of Patent: Feb. 27, 2007

(54) PROCESSOR WITH SPECULATIVE MULTITHREADING AND HARDWARE TO SUPPORT MULTITHREADING SOFTWARE

(75) Inventors: Joseph Chamdani, Santa Clara, CA (US); Yuan Chou, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 623 days.

(21) Appl. No.: 10/271,838

(22) Filed: Oct. 15, 2002

(65) Prior Publication Data

US 2004/0073906 A1  Apr. 15, 2004

(51) Int. Cl.
*G06F 9/46* (2006.01)
*G06F 9/44* (2006.01)

(52) U.S. Cl. ..................... 718/102; 712/217

(58) Field of Classification Search ........ 718/100–108; 712/28–242; 711/100–117
See application file for complete search history.

(56) References Cited

U.S. PATENT DOCUMENTS

| | | | | |
|---|---|---|---|---|
| 5,185,872 A * | 2/1993 | Arnold et al. | ............... | 712/217 |
| 5,809,450 A | 9/1998 | Chrysos et al. | ............. | 702/186 |
| 5,832,262 A * | 11/1998 | Johnson et al. | ............. | 718/102 |
| 5,835,705 A | 11/1998 | Larsen et al. | .......... | 395/184.01 |
| 5,890,008 A | 3/1999 | Panwar et al. | ......... | 395/800.15 |
| 5,913,059 A * | 6/1999 | Torii | ......................... | 718/104 |
| 5,961,639 A * | 10/1999 | Mallick et al. | ............. | 712/242 |
| 6,212,542 B1 * | 4/2001 | Kahle et al. | ................ | 718/102 |
| 6,353,881 B1 | 3/2002 | Chaudhry et al. | .......... | 712/228 |
| 6,907,517 B2 * | 6/2005 | Ohsawa et al. | ............. | 712/216 |
| 6,928,645 B2 * | 8/2005 | Wang et al. | ................ | 718/102 |
| 6,938,147 B1 * | 8/2005 | Joy et al. | ...................... | 712/28 |
| 2003/0135713 A1 * | 7/2003 | Rychlik et al. | ............. | 712/217 |

OTHER PUBLICATIONS

Dubey et al., "Single-Program Speculative Multithreading (SPSM) Architecture: Compiler-assisted Fine-Grained Multithreading," *IBM Research Report*, Feb. 1995.
Hammond et al., "Data Speculation Support for a Chip Multiprocessor", *ACM SIGPLAN Notices*, 1998;33(11):58-69.

(Continued)

*Primary Examiner*—Meng-Al T. An
*Assistant Examiner*—Jennifer N. To
(74) *Attorney, Agent, or Firm*—Dorsey & Whitney LLP

(57) ABSTRACT

A computer system includes a processor capable of executing a plurality of N threads of instructions, N being an integer greater than one, with a set of global registers visible to each of the plurality of threads and a plurality of busy bit memory elements used to signal whether or not a register is in use by a thread. The processor includes logic to stall a read from global register if the thread reading the global register is a speculative thread and the busy bits for prior threads are set. The processor might also include a speculative load address memory, into which speculative loads from speculative threads are entered and logic to compare addresses for stores from nonspeculative threads with addressees in the speculative load address memory and invalidate speculative threads corresponding to the speculative load addresses stored in the speculative load address memory. In an efficient implementation, aliasing load instructions can be distinct from nonaliasing load instructions, whereby addresses of aliasing load instructions are selectively stored in the speculative load address memory.

3 Claims, 4 Drawing Sheets

| VA | Bits | ASI Name | Access |
|---|---|---|---|
| 0x10 | 63-0 | THREAD_START_PC | RW |
| 0x11 | 7-0 | THREAD_ENABLE | RW |
| 0x12 | 0 | NS_TID | RW |
| 0x13 | 3 | THREAD_INTERRUPT | RW |
| | 2-0 | INTERRUPT_TID | RW |
| 0x14 | 0 | RESOLVE_SPEC_STATE<br>0 – flush speculative state<br>1 – commit speculative state | RW |
| 0x15 | 7-0 | NUM_THREADS | RO (read only) |
| 0x16 | 0 | RE_EXECUTE_FLAG | RW |

| VA | Bits | ASI Name | Access |
|---|---|---|---|
| 0x0 | (K - 1) to 0 | M_REG_BUSY_BITS_CONTROL | RW |
| | K | *Writes*: If Bit K = 0, set busy bits for own thread; If Bit K = 1, set busy bits for all threads<br><br>*Reads*: Bit K ignored | |
| 0x20 | 63-0 | M_REG_0_DATA | RW |
| ... | ... | ... | ... |
| 0x27 | 63-0 | M_REG_7_DATA | RW |

OTHER PUBLICATIONS

Krishnan et al., "Hardware and Software Support for Speculative Execution of Sequential Binaries on a Chip-Multiprocessor," *SIGARCH 1998 International Conference on Supercomputing*, Jul. 1998;85-92.

Sohi et al., "Multiscalar Processors," *SIGARCH 22nd Annual International Symposium on Computer Architecture*, Jun. 1995;414-425.

Steffan et al., The Potential for Using Thread-Level Data Speculation to Facilitate Automatic Parallelization, *HPCA-4*, Feb. 1998.

Tsai et al., "Performance Study of a Concurrent Multithreaded Processor" *IEEE Computer Society 1998 Fourth International Symposium on High-Performance Computer Architecture*, Feb. 1998;24-35.

\* cited by examiner

| VA | Bits | ASI Name | Access |
|---|---|---|---|
| 0x10 | 63-0 | THREAD_START_PC | RW |
| 0x11 | 7-0 | THREAD_ENABLE | RW |
| 0x12 | 0 | NS_TID | RW |
| 0x13 | 3 | THREAD_INTERRUPT | RW |
| | 2-0 | INTERRUPT_TID | RW |
| 0x14 | 0 | RESOLVE_SPEC_STATE<br>0 – flush speculative state<br>1 – commit speculative state | RW |
| 0x15 | 7-0 | NUM_THREADS | RO (read only) |
| 0x16 | 0 | RE_EXECUTE_FLAG | RW |

| VA | Bits | ASI Name | Access |
|---|---|---|---|
| 0x0 | (K - 1) to 0 | M_REG_BUSY_BITS_CONTROL | RW |
| | K | *Writes*: If Bit K = 0, set busy bits for own thread; If Bit K = 1, set busy bits for all threads<br><br>*Reads*: Bit K ignored | |
| 0x20 | 63-0 | M_REG_0_DATA | RW |
| ... | ... | ... | ... |
| 0x27 | 63-0 | M_REG_7_DATA | RW |

*FIG. 3*

PROCESSOR WITH SPECULATIVE MULTITHREADING AND HARDWARE TO SUPPORT MULTITHREADING SOFTWARE

BACKGROUND OF THE INVENTION

The present invention relates to processor structure in general and to multithreading processors in particular.

Multithreading is a process of breaking a program up into threads where one thread can be executed while another thread is being executed. Multithreading differs from parallel processing in that multithreading can be done with a single processor. If a processor were always active, performing an operation in each processor clock cycle, multiprocessing would not improve the processor's performance, because the total number of instructions performed by the processor is usually not reduced by multiprocessing. However, where one section of code might stall a processor, another section of code could be processed during that stall period where the processor would otherwise be idle. For example, if multiple clock cycles were needed to retrieve memory following a cache miss, a single-threaded processor would just wait for the results from the slow memory. However, with multithreading, a second thread could be started when the first thread stalls.

Ideally, the second thread would be independent of the first thread. Being independent means that the processing done in the second thread does not depend on a memory value or register value that is to be changed by the first thread and the processing done in the first thread does not depend on a memory or register value that has already been changed by the second thread. With this independence, the two threads can be executed at the same time without violating the causality normally expected in a program, i.e., that the effects of later instructions (the second thread) are not experienced by earlier instructions (the first thread) and the intended effect of the earlier instructions on the later instructions still occurs even if some of the instructions in the second thread are executed before some instructions in the first thread.

Speculation is another process by which processor performance can be improved. Speculation is often done with pipelined processors, where a processor speculates on the outcome of an operation that is done by a later stage in the pipeline in order to keep earlier stages busy and filling the pipeline. One common use of speculation is for branch prediction. If an early stage of a pipeline processes instructions and a later stage determines which of two branches to take, the pipeline might speculate on which branch will end up being taken, so that the pipeline can process instructions in hopes of that speculation being correct. Of course, for speculation to be worthwhile, it must save enough processing time and be right enough of the time to overcome the extra effort required for speculation. Speculating requires extra effort in the form of processing to make the speculation as well as processing to ensure that the effects of a speculation can be reversed if that speculation later turns out to be wrong.

SUMMARY OF THE INVENTION

A computer system includes a processor capable of executing a plurality of N threads of instructions, N being an integer greater than one, with a set of global registers visible to each of the plurality of threads and a plurality of busy bit memory elements used to signal whether or not a register is in use by a thread. The processor includes logic to stall a read from global register if the thread reading the global register is a speculative thread and the busy bits for prior threads are set. The processor might also include a speculative load address memory, into which speculative loads from speculative threads are entered and logic to compare addresses for stores from nonspeculative threads with addressees in the speculative load address memory and invalidate speculative threads corresponding to the speculative load addresses stored in the speculative load address memory. In an efficient implementation, aliasing load instructions can be distinct from nonaliasing load instructions, whereby addresses of aliasing load instructions are selectively stored in the speculative load address memory.

A further understanding of the nature and advantages of the inventions herein may be realized by reference to the remaining portions of the specification and the attached drawings.

BRIEF DESCRIPTION OF THE DRAWINGS

FIG. 3 is a table illustrating the control registers in one embodiment of a control register array as might be used in the processor shown in FIG. 2.

DESCRIPTION OF THE SPECIFIC EMBODIMENTS

A detailed description of various embodiments of the present invention is provided by the attached figures. Below, the contents of the figures are described, followed by the details of one example of a processor and computer system shown in the figures, and several variations. In the figures, like elements are labelled with like numbers and different instances of like elements are labelled with like numbers and different parenthetical numbers or letters.

The processor described below supports speculative multithreading. In speculative multithreading, the processor can execute threads before their data and control dependencies are resolved. As described below, the processor includes hardware that supports speculative memory accesses and efficient inter-thread communication. The instructions making up the multiple threads can be generated from a sequential binary by a binary annotator or from sequential source code by a compiler. The speculative multithreading described herein has many uses, but one of which is to speed up non-numeric applications that might not be amendable to parallelization by traditional parallelizing compilers because of their complex control flow and memory reference patterns.

Figure 1:
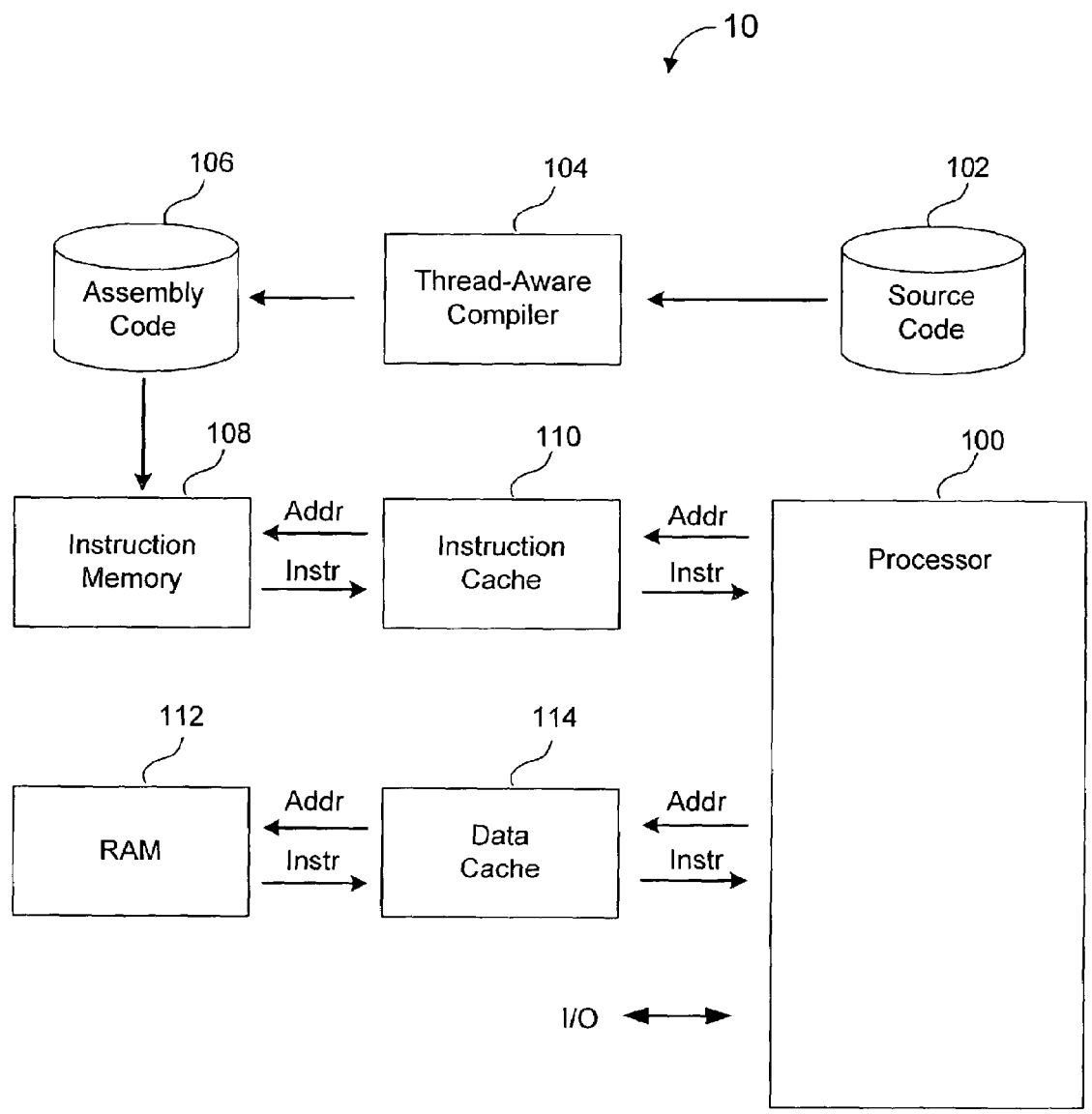
FIG. 1 is a block diagram of a computer system capable of executing multiple threads of instructions, including a processor according to one embodiment of the present invention.

FIG. 1 provides an overview of the environment where a multithreading processor according to the present invention might be used. As shown in that figure, a computer system 10 includes a processor 100. Processor 100 executes instructions selected from an instruction set, as is well known in the art of processor design. Those instructions might originate as source code 102 provided to a thread-aware compiler 104 that generates assembly code 106 corresponding to source code 102. Additional details of compiler 104 are provided below, but for the purposes of explanation here, it should be understood that compiler 104 preferably optimizes or arranges assembly code 106 to facilitate parallel processing of a plurality of threads.

Assembly code 106 is provided to an instruction memory 108 that is coupled to processor 100 via an instruction cache 110. A data memory 112, such as random access memory (RAM), is also coupled to processor 100, in this case through a data cache 114. As is known from processor system design, the caches 110, 114 are not necessary, but often can speed up the response time of their respective memories to reduce delays experienced by processor 100. Processor 100 might also include some provision for input/output (I/O) operations.

As explained below, processor 100 is a processor with speculative multithreading capability. With such a capability, processor 100 can execute multiple threads of instructions, but might at times execute only one thread of instructions. Assembly code 106 can be arranged to improve the efficiency of the threading process, but that need not be the case. For example, while FIG. 1 shows that assembly code 106 is generated by thread-aware compiler 104, other sources of assembly code could be used instead.

Processor 100 could be a single processor or it could be a part of a multi-processor or a parallel processor system. One example of a processor that can be used as processor 100 is a processor designed using the SPARC V9 instruction set architecture and the UltraSPARC2 microarchitecture, both of which were developed by Sun Microsystems of Palo Alto, Calif.

Figure 2:
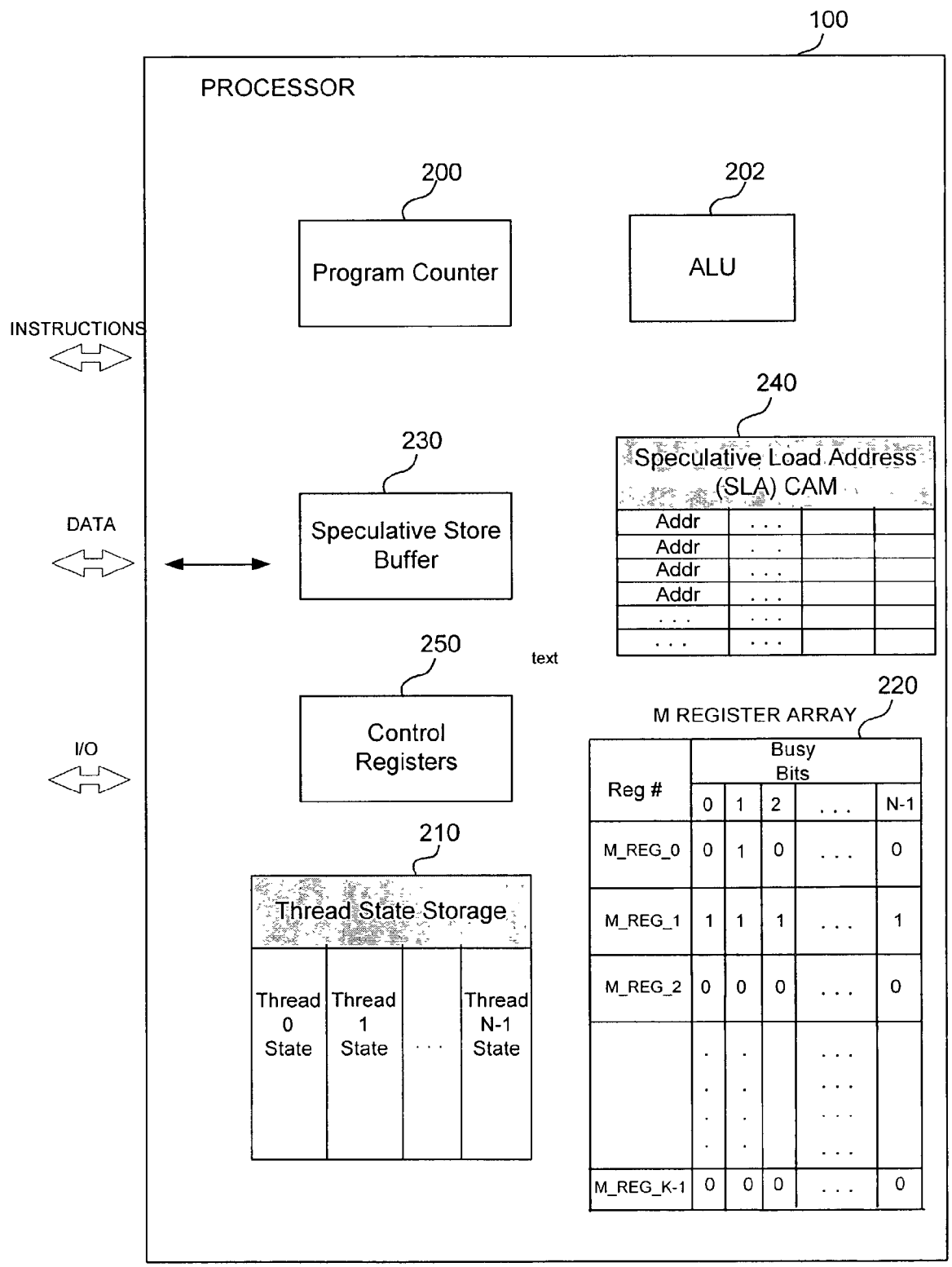
FIG. 2 is a block diagram of one such processor in greater detail.

FIG. 2 shows processor 100 in more detail. As shown there, processor 100 includes many conventional components of a microprocessor, such as a program counter 200 and an ALU (Arithmetic Logic Unit) 202. Other components shown support speculative multithreading, such as thread state storage 210, an M register array 220, a speculative store buffer 230, a speculative load address (SLA) content-addressable memory (CAM) 240 and a set of control registers 250. Processor 100 is capable of executing N threads at a time, with N being two or more. In one prototype, described throughout this disclosure, N is two (thread 0 and thread 1). Other elements, and interconnections between the elements shown, are omitted from FIG. 2 for clarity, but the interconnections between elements shown or unshown in FIG. 2 can be inferred from the below description of the operation and uses of those elements.

FIG. 3 illustrates one possible arrangement of control registers 250. In the prototype, control registers 250 and M register array 220 are provided by one data structure implemented in an unused Address Space Identifier (ASI) with the virtual address (VA) values shown in FIG. 3.

Figure 4:
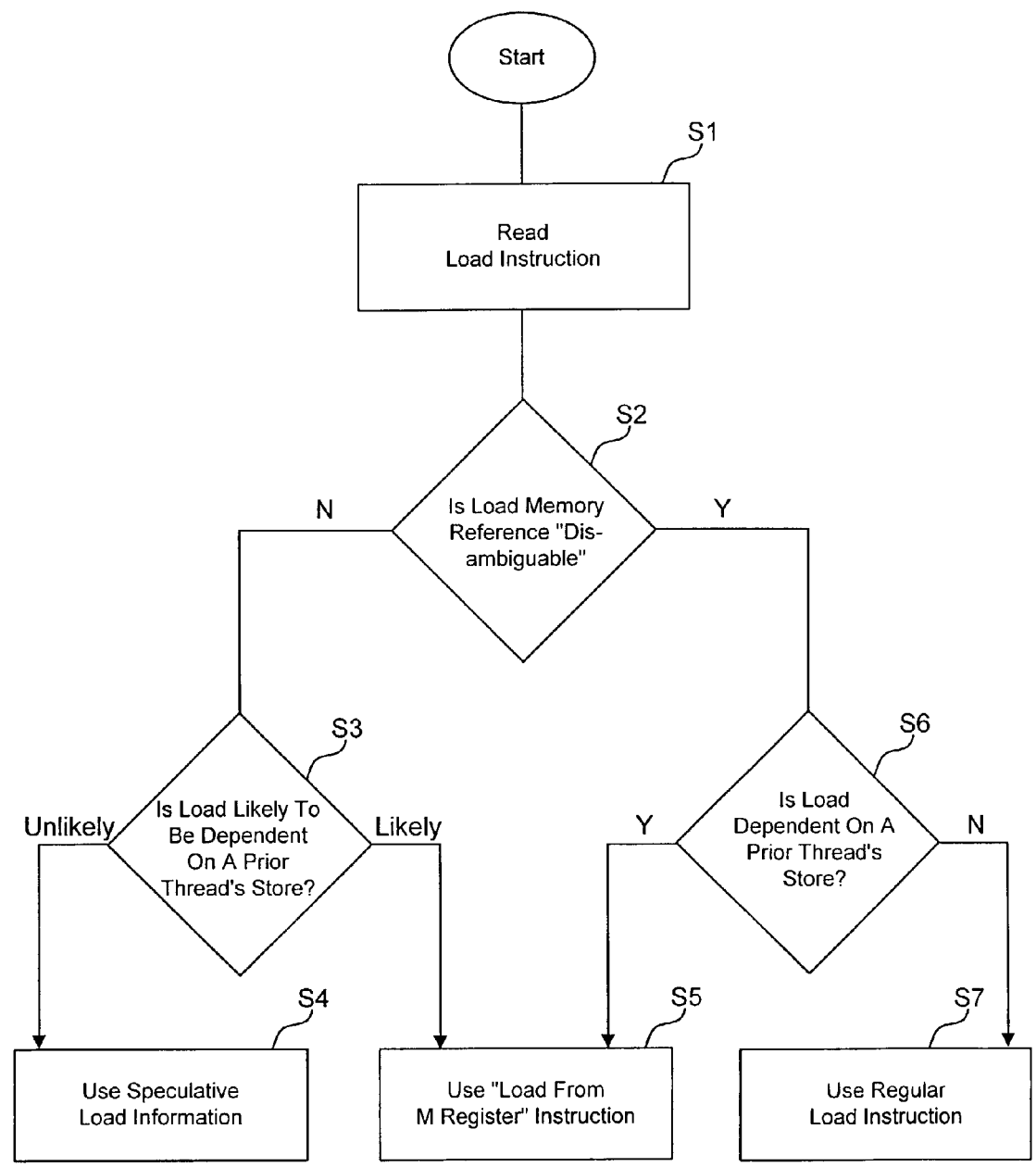
FIG. 4 is a flowchart of one process for selecting loading methods for instructions to be executed by a processor according to one embodiment of the present invention.

FIG. 4 is a flowchart illustrating the process used by a compiler or other decision maker to decide on what type of instruction to use for a load instruction. The process will now be described with reference to a compiler. In converting source code to assembly code, the compiler might encounter a load instruction or have the need to generate an assembly level step of loading data from memory for processing by a thread.

In a first step (S1), the compiler reads the load instruction or otherwise determines that an assembly level load is needed. Then, the compiler determines whether the address for the memory load is "disambiguable" (S2). An address is "disambiguable" if the reference to a particular address can be determined at static time before the program is run.

If the address is not disambiguable, the compiler then determines if the load is likely to be dependent on a memory store executed in a prior thread (S3). There are various methods a compiler could use to determine whether an address is disambiguable, such as checking the address register or the variable name. If dependency is unlikely, the compiler will use a speculative load instruction (S4), otherwise the compiler will use an M register for the load (S5). If, at step S2, the compiler determines that the load memory reference is disambiguable, then the compiler determines whether or not the load is dependent on a store operation performed by a prior thread (S6). If the load is dependent on a store operation from a prior thread, an M register is used instead of memory (S5). If the load is not dependent on a prior thread, then a regular load instruction is used (S7).

As explained herein, using an M register (and its associated busy bits), a thread attempting a load from an M register can be stalled until a prior thread's store is complete without having to include any special software processing. This is because the hardware will not return the value from the M register until the prior thread releases the register. As far as the current thread attempting the load is concerned, it is waiting for the hardware (processor logic) to return a value and that thread will continue to wait until the value is returned.

In one implementation, the busy bits for M registers are set and reset by a thread by writing to a busy bits control register. The busy bits control register includes K+1 bits, with the first K bits (0 through K−1) indicating which of the K M registers will be marked as being busy and bit K being used to signal whether to set the busy bits for the thread writing the control register (K=0) or set the busy bits for all threads (K=1).

A process for using speculative multithreading with processor 100 will now be described with reference to the elements of processor 100 shown in FIG. 2 and elsewhere. In general the process involves partitioning a program into multiple threads, forking threads at runtime, handling interthread register and memory dependencies, handling speculative memory accesses and recovering from control dependence misspeculations and data dependence misspeculations.

Thread partitioning can be performed by either a binary annotator operating on sequential executable code (such as assembly code) or by a compiler operating on sequential source code. Loops are particularly suitable for multithreading because they often account for a large proportion of a program's execution time and the number of instructions executed in each iteration of the loop often does not vary too much, leading to reasonable load balancing among threads. Another good point to divide code among threads is to execute a function (callee) in one thread and the code that follows the function (in the caller) in another thread running in parallel.

When partitioning code into threads, several considerations should be taken into account. First, the thread should contain enough instructions to amortize the overhead imposed by multithreading (speculative or otherwise), but if the thread is speculatively multithreaded, it should not be so many instructions that the storage available to buffer a thread's speculative state is overloaded. A thread's speculative state includes elements such as the thread's speculative stores, which are buffered in case it later turns out that the speculative thread needs to be cancelled.

Second, the number of inter-thread dependencies, their dependence distance, the frequency in which they occur and whether their occurrences are predictable must be considered. Since fewer dependencies increases the likelihood that a particular thread can execute independently of other threads, the compiler should attempt to remove avoidable dependencies or reschedule the code within the thread to maximize the dependence distance between unavoidable dependencies. One example of an avoidable dependence is where a reference to a frame pointer depends on an update of that frame pointer across function calls. If two threads contain function calls, the second thread will be forced to wait until the first thread completes its function call before the second thread is allowed to make its function call, thus causing unnecessary serialization.

One target for thread partitioning is loops with few and/or infrequent dependencies between iterations and, where dependencies exist, long dependence distances (after code rescheduling if necessary). Preferably, these loops do not make function calls within their iterations, for reasons explained above). Thread partitioning can be done manually, but it might be more efficiently performed using a binary annotator or a compiler to automate thread partitioning.

In most code, threads are not completely independent, but have some data dependence on other threads. This data dependence can occur in the form of register dependencies, where one thread is going to read a register that another thread is going to write, or memory dependencies, where one thread is going to read a memory location that another thread is going to write. To determine the register dependencies between the two threads, one needs to determine the set of registers written by the first thread that are live-ins to the second thread (i.e., dependent on inputs to the second thread). If there are multiple possible control flow paths in the first thread, one must determine all the registers that can possibly be written by the possible control flow paths. When the second thread reads one of these registers, that thread must wait until the register has been written by the first thread. Conversely, when the first thread writes this register, it must communicate the data to the second thread, and if the second thread is blocked waiting for the data, wake it up. In the event that the actual control flow path taken by the first thread does not write one of these registers, it must notify the second thread so that the second thread does not wait indefinitely for the data to arrive.

Memory dependencies are more difficult to handle because many memory store and load instructions using addressing schemes where the effective addresses of the operation cannot be determined ahead of time, but is calculated at runtime, possibly requiring other instructions to calculate the effective address. With speculative multithreading, one thread begins before a prior thread ends and that later thread might begin before the processor can determine whether or not memory dependencies are present between the two threads. The later thread is speculative in that, if the processor later determines that a memory dependence was violated (i.e., the later thread loaded from a memory location before the earlier thread stored to that same location), the later thread must be flushed and re-executed. Flushing the thread requires undoing any changes that the thread made or would have made. In an aggressively threaded processor, the entire thread is not flushed, but just the affected instructions are reversed.

In order to be able to flush a speculative thread prior to its re-execution, stores from the speculative thread should not irreversibly modify the state of the processor until the thread becomes nonspeculative. Some operations that cannot be assured of reversibility, such as some forms of memory mapped I/O operations or other operations with destructive side effects, and those operations should not be executed speculatively.

When a control dependence misspeculation occurs, the speculative thread should be flushed (i.e., cancelled and any effects reversed). Likewise, when a data dependence misspeculation occurs, the speculative thread should be re-executed with the correct data.

There are several ways to implement a speculative multithreaded processor. One way is to use a vertically multithreaded microarchitecture. In a vertically multithreaded processor, the architecture states of multiple threads are resident in the processor but instructions from only one thread are processed at any one time. When a long latency operation (e.g., a cache miss) stalls the processor in one thread, the processor starts processing instructions from another thread, thus improving processor utilization and application performance.

One implementation of a vertically multithreaded microarchitecture uses a processor with the SPARC V9 architecture and the UltraSPARC2 microarchitecture, modified to handle multiple threads in a speculative manner. In order to use existing tools available for such architectures as much as possible, such a speculative multithreaded processor can be built without adding new instructions to the SPARC V9 architecture and minimizing modifications to the UltraSPARC2 microarchitecture.

One solution is to use the above-described M register array, which is a register array that is visible to all threads, for inter-thread register communication. The M registers can also be used to enforce data dependencies across threads.

Speculative store buffer 230 is used to buffer stores made by speculative threads so that the stores can be cancelled if the speculative thread is cancelled. In the SPARC/UltraSPARC2 architecture processor, the UltraSPARC2's store buffer is used to implement speculative store buffer 230. Store buffer 230 operates with SLA CAM 240 to record the addresses of speculative loads that may alias to stores from a predecessor thread.

No new instructions are needed in the SPARC V9 architecture if the unused non-restricted (user space) ASI registers are used. In such an implementation, ASI values represent the M registers, the busy bits and control registers 250 to support thread forking, thread cancellation and thread re-execution. For example, ASI value=0×90 could be used with the VAs as shown in FIG. 3. The ASIs are accessible via Load from Alternate Space and Store to Alternate Space instructions. ASI value=0×91 could be used to handle loads that have to be subsequently checked for aliasing with stores from a previous thread, as described below.

As illustrated in FIG. 3, the THREAD_INTERRUPT and INTERRUPT_TID fields are used to preempt the current thread and switch execution to the thread specified by INTERRUPT_TID. The latter thread executes at the address specified by THREAD_START_PC. NS_TID indicates which thread is currently the nonspeculative thread (as shown, being one bit wide, NS_TID only accommodates N=2, i.e., two threads at a time, but extending NS_TID for higher values of N should be straightforward given this description). THREAD_ENABLE is a bit mask that controls which threads are currently enabled. RESOLVE_SPEC_STATE is used to either commit or purge speculative state. NUM_THREADS indicates the number of vertical threads supported by the processor (related to the value N in the figures). The RE_EXECUTE_FLAG is used to indicate if a data dependence misspeculation occurred in the current thread.

The processor sets up a new thread when instructions are encountered that signal that a new thread can be forked, for example when a loop is entered. Prior to executing the multithreaded loop, only one thread (TO) is active. To start executing the multithreaded loop, thread T0 forks off T1. T0 executes the first iteration of the loop nonspeculatively, while T1 executes the second iteration speculatively. A detailed example of one such process is shown in Table 1 (thread T0) and Table 2 (thread T1), beginning with a loop prologue.

TABLE 1

Thread T0 Execution

!Spill scratch registers onto stack (if no free scratch registers
!available). Here, %l1 is a spill register
stx %l1, [%sp+n]
!Copy stack pointer to %m0. This operation only needs to be
performed once (e.g., at the beginning of main( )
wr %g0, 0x90, %asi
stxa %sp, [%g0+0x20] %asi
!Copy loop live-ins to stack (here, the only loop live-in is %g1
stx %g1, [%sp+m]
!Initialize M registers that are used
!(here, assume only %m1 is used in the loop)
stxa %rs, [%g0+0x21] %asi   !initialize %m1 to value in %rs
!Set busy bits of M registers for both threads
mov 0x102, %l1
stxa %l1, [%g0+0x0] %asi
!Initialize NONSPEC_TID = 0
stuba %g0, [%g0+0x12] %asi
!Make sure T1 is enabled by setting THREAD_ENABLE = 00000011
mov 0x3, %l1
stuba %l1, [%g0+0x11] %asi
!Set THREAD_START_PC to beginning of loop iteration
set .loop, %l1
stxa %l1, [%g0+0x10] %asi
!Fork T1 by setting THREAD_INTERRUPT = 1 and
INTERRUPT_TID = 1
mov 0x9, %l1
stuba %l1, [%g0+0x13]
!Make sure any old speculative state is flushed
stuba %g0, [%g0+0x14] %asi
!Restore scratch registers (if no free scratch registers available)
ldx [%sp+n], %l1
!Start executing first iteration
. . .

TABLE 2

Thread T1 Execution

!Copy stack pointer from %m0
ldxa [%g0+0x20] %asi, %sp
!Copy loop live-ins from memory to local registers
ldx [%sp+m], %rd
!Spill scratch registers onto stack (if no free registers available)
stx %l1, [%sp+n]
!Make sure any old speculative state is flushed
stuba %g0, [%g0+0x14] %asi
!Restore scratch registers (if no free scratch registers available)
ldx [%sp+n], %l1
!Start executing second iteration The processor handles inter-thread register dependencies by using the M registers. To synchronize accesses to these M registers, M register array 220 includes busy bits storage for each thread and each M register (K×N bits). If an M register is used in a multithreaded loop, all of its busy bits (for all threads) are initially set to "busy". Reads from the nonspeculative thread to that M register can proceed regardless of the state of the busy bits. However, reads from a speculative thread cannot proceed unless the busy bits corresponding to that M register and each previous thread (threads previous to the speculative thread attempting the read) have been cleared (set to "not busy").

When a thread executes as the current thread and writes to an M register, the busy bit corresponding to that M register of the current thread is cleared. The M register is typically only used on the final write of a register/operand value. If there are multiple intermediate values being generated, the compiler will use non-M registers for intermediate values.

In one implementation, the M registers and busy bits are implemented as part of the ASI value=0×90 user space. In several examples of code used herein, K=8 and the busy bits are set via the M_REG_BUSY_BITS_CONTROL (VA=0× 0) ASI, with a write to bits 7-0 of VA=0×0 used to specify which M registers are affected and a write to bit 8 used to specify whether the write applies to just the current thread's own busy bits register or to the busy bits for all threads. Bit 8 is ignored on a read.

Busy bits are shared by both threads. A thread can read them through the M_REG_BUSY_BITS_CONTROL ASI register. Since the M registers are a shared resource, the compiler guarantees that an M register write is done serially in the correct program order. Thus, the busy bits help to enforce the synchronization barrier.

For example, a multithreaded loop which uses an M register referenced by % m1 to handle a loop carried dependency has a loop prologue wherein the busy bits registers of both threads (here, N=2 is assumed) are initialized to the bit pattern 00000010 to indicate that % m1 is busy (it has not been written yet). If thread T0 is nonspeculative and thread T1 is speculative, then when T0 reads % m1, it can proceed regardless of the state of the busy bits, but when T1 reads % m1, it must check that T0 has already cleared the busy bits corresponding to % m1 in its busy bits register. Otherwise, T1 blocks until T0 has written % m1. When T0 writes % m1, it clears the busy bit corresponding to % m1 in its busy bits register and wakes up T1. The code sequences corresponding to an M register read and a write are shown in Table 3.

TABLE 3

Example of M Register Read/Write ldxa [%g0+0x21] %asi, %rd ! read %m1
stxa %rs, [%g0+0x21] %asi ! write %m1

Several variations are possible for a mechanism to handle inter-thread memory dependencies. One variation described below is used use as much as possible of the existing UltraSPARC2 Load Store Unit. To do this, memory loads are differentiated into regular loads and speculative loads. A regular load is a load that is guaranteed not to alias with a store from a prior thread. A speculative load is a load that cannot be guaranteed not to alias with a store from a prior thread. Regular loads can be handled by UltraSPARC2's existing mechanisms, while speculative loads require extra processing, therefore it is more efficient to label some loads as regular loads rather than processing all loads as potentially speculative loads. However, in an architecture where little or no extra processing is needed for speculative loads, such differentiation might not be needed or used.

Where regular loads are more efficient, a compiler should be designed to identify as many regular loads as possible, thus minimizing the number of speculative loads. Also, if the compiler determines that a load will definitely or very likely alias to a store from its immediate predecessor thread, it should use the M register mechanism (which enforces dependencies) instead of memory, as that would prevent costly memory dependence misspeculations. Loads that are identified as speculative loads are converted to the form shown in Table 4.

TABLE 4

Example of Conversion to Speculative Load Instructions

| Regular Load | Speculative Load |
| --- | --- |
| ldx [%rs1+%rs2], %rd | => ldxa [%rs1+%rs2] %0x91, %rd |
| ldx [%rs1+imm], %rd | => wr %g0,0x91, %asi !only needs to be done once. |
| | ldxa [%rs1+imm] %asi, %rd |

If a speculative load is performed by a nonspeculative thread, it can be processed as a regular load. However, if a speculative load is performed by a speculative thread, the speculative load handling should be done. Speculative load handling here includes entering the effective address of the load into SLA CAM 240. If SLA CAM 240 fills up, no more speculative loads can be issued and the processor will stall a speculative thread if the thread encounters a speculative load.

To detect memory dependence misspeculations, SLA CAM 240 is checked for address matches between a store from a nonspeculative thread and a prior load by a speculative thread. If a match is found, a memory dependence misspeculation has occurred and the speculative thread's re-execute flag is set. To prevent speculative stores from modifying the processor's state, such stores are held in the thread's store buffer (part of thread state storage 210).

When a speculative thread becomes nonspeculative, if that thread's re-execute flag is not set, the speculative stores held in the store buffer for that thread are committed and released by writing 1 to ASI RESOLVE_SPEC_STATE. This also clears the SLA CAM for those committed stores.

When a thread reaches the end of a loop iteration, it must wait until it becomes the nonspeculative thread. This is accomplished by performing a read to an M register without first writing it (since the semantics of an M register read is that the nonspeculative thread can perform a read regardless of the state of the busy bits), using an instruction such as:

ldxa [% g0+0x27]% asi, % rd ! e.g., read % m7

When that thread becomes the nonspeculative thread, if its re-execute flag is set, the state of the thread is flushed and the thread is re-executed, using code such as that shown in Table 5. The value of the re-execute flag can be determined by reading the ASI RE_EXECUTE_FLAG using an instruction such as:

ldxa [% g0+0x16]% asi, % rd or the like.

TABLE 5

Instructions to Re-Execute a Flushed Thread

!Flush speculative state
!(i.e., flush SLA CAM, Load Buffer and StoreBuffer)
stuba %g0, [%g0+0x14] %asi
!Re-initialize its busy bits register
mov 0x2, %l1
stxa %l1, [%g0+0x0] %asi
!Clear re-execute flag
stuba %g0, [%g0+0x16] %asi
!Re-copy live-ins from stack into local registers
ldx [%sp+m], %rd
!Restart execution at the beginning of the loop iteration.
(At this point, if the thread's re-execute flag is not set, check if this is the last iteration, i.e., the loop has finished. If not, proceed with the following instructions)

TABLE 5-continued

Instructions to Re-Execute a Flushed Thread

!Commit speculative state (i.e., release stores from Store Buffer and
!flush SLA CAM)
mov 0x1, %l1
stuba %l1, [%g0+0x14] %asi
!Toggle NONSPEC_TID
mov 0x2, %l1
stuba %l1, [%g0+0x12] %asi
!Re-initialize its busy bits register
mov 0x2, %l1
stxa %l1, [%g0+0x0] %asi
!Clear re-execute flag
stuba %g0, [%g0+0x16] %asi
!Start executing iteration i+2 speculatively (where i is the
!iteration that just finished).
(If this is the last iteration and NONSPEC_TID=0, i.e., the current
thread is T0, execute the following two instructions and run the code
after the loop in single-threaded mode)
mov 0x1, %l1
stuba %l1, [%g0+0x11] %asi !Set THREAD_ENABLE = 1 TO
Disable T1
(If this is the last iteration and NONSPEC_TID=1, i.e., the current
thread is T1, execute the following.)
!Copy live-outs to the stack
!Thread switch to T0 by setting THREAD_START_PC to the
appropriate
!address, THREAD_INTERRUPT = 1 and INTERRUPT_TID = 0
set .code_after_loop, %l1
stxa %l1, [%g0+0x10] %asi
mov 0x9, %l1
stuba %l1, [%g0+0x13]
!T0 copies live-outs from stack to local registers
!T0 disables T1 by setting THREAD_ENABLE = 1
mov 0x1, %l1
stuba %l1, [%g0+0x11] %asi
!T0 runs the code after the loop in single-threaded mode A computer system including a processor capable of executing a plurality of threads using busy bits and a globally accessible register array has now been described, including a mechanism for handling speculative loads and a mechanism for differentiating between regular and speculative loads. An example of source code compiled to take advantage of a speculative multithreaded processor is attached hereto as Appendix A. There, the example of a rgb_ycc_convert( ) function (from the SPECint95 benchmark IJPEG) is used. The original assembly code was obtained by compiling the C source file with the -S option. Note that because loop iterations do not contain memory dependencies, there is no possibility of memory dependence misspeculation. As a result, there is no need for code at the end of each loop iteration to test if the re-execute flag is set.

The function rgb_ycc_convert( ) is a hot (frequently executed) function that accounts for about 9% of the total instructions completed. It contains a doubly-nested loop. The inner loop was multithreaded because it has fewer inter-iteration dependencies and, with code rescheduling, each of its inter-iteration dependencies have a large dependence distance, allowing the execution of loop iterations to be heavily overlapped.

The foregoing description of preferred embodiments of the invention has been presented for the purposes of description. It is not intended to be exhaustive or to limit the invention to the precise form described, and modifications and variations are possible in light of the teaching above. For example, given the explanation above, it will be appreciated that processor circuits can be designed using the principles of this invention different from those shown here to create the same effects of speculative multithreading.

APPENDIX A

```
                    .section      ".text",#alloc,#execinstr
/* 000000              0 */                    .align        4
!
! SUBROUTINE  rgb_ycc_convert
!
! OFFSET     SOURCE LINE LABEL     INSTRUCTION
                    rgb_ycc_convert:
/* 000000           */             save          %sp,-384,% sp      /* stack area is increased! */
/* 0x0004     130   */             ld            [%i0+24],%l0
/* 0x0008     132   */             subcc         %i4,1,%l3
/* 0x000c     126   */             ld            [%i0+320],%g2
/* 0x0010     132   */             bneg,pt       %icc,.L77000149
/* 0x0014           */             ld            [%g2+8],%o0
/* 0x0018           */             cmp           %l0,0
/* 0x001c           */             bgu,pn        %icc,.L900000220
/* 0x0020           */             or            %g0,%i1,%o3
/* 0x0024           */             ret                         ! Result =
/* 0x0028           */             restore       %g0,%g0,%g0
                    .L900000220:
/* 0x002c           */             sll           %i3,2,%l4
/* 0x0030     123   */             or            %g0,%i2,%o2
/* 0x0034     132   */             sethi         %hi(0x1c00),%l1
/* 0x0038     159   */             ld            [%o2],%g2
/* 0x003c     132   */             sethi         %hi(0x1400),%i2
/* 0x0040           */             sethi         %hi(0x1800),%l2
/* 0x0044           */             sethi         %hi(0x1000),%l5
                    .L900000218:
/* 0x0048           */             ld            [%o2+4],%g3
/* 0x004c           */             or            %g0,0,%ol
/* 0x0050     132   */             cmp           %l0,3
/* 0x0054     159   */             ld            [%o2+8],%g4
/* 0x0058           */             or            %g0,1,%i0
/* 0x005c           */             ld            [%o3],%i1
/* 0x0060           */             add           %o3,4,%o3
/* 0x0064           */             ld            [%g2+%l4],%i3
/* 0x0068           */             ld            [%g3+%l4],%i4
/* 0x006c           */             ld            [%g4+%l4],%i5
/* 0x0070           */             add           %l4,4,%l4
/* 0x0074     132   */             bl,pn         %icc,.L77000144
/* 0x0078           */             sub           %l0,1,%l6
/* 0x007c     139   */             ldub          [%i1],%o4
/* 0x0080     142   */             add           %i1,3,%i1
/* 0x0084     140   */             ldub          [%i1-2],%o7
/* 0x0088     141   */             ldub          [%i1-1],%o5
/* 0x008c     151   */             sll           %o4,2,%o4
/* 0x0090           */             sll           %o7,2,%o7
/* 0x0094           */             add           %o0,%o4,%o4
/* 0x0098           */             sll           %o5,2,%o5
/* 0x009c           */             add           %o0,%o7,%o7
/* 0x00a0           */             ld            [%o4],%g1
/* 0x00a4           */             ld            [%o7+1024],%g3
/* 0x00a8           */             add           %o0,%o5,%o5
/* 0x00ac           */             ld            [%o5+2048],%g2
/* 0x00b0           */             add           %g1,%g3,%g1
/* 0x00b4           */             add           %g1,%g2,%g1
/* 0x00b8           */             sra           %g1,16,%g1
/* 0x00bc           */             stb           %g1,[%i3]
/* 0x00c0     155   */             ld            [%o7+%l5],%g3
/* 0x00c4           */             ld            [%o4+3072],%g1
/* 0x00c8           */             ld            [%o5+%i2], %g2
/* 0x00cc           */             add           %g1,%g3,%g1
/* 0x00d0           */             add           %g1,%g2,%g1
/* 0x00d4           */             sra           %g1,16,%g1
/* 0x00d8           */             stb           %g1,[%i4]
/* 0x00dc     159   */             ld            [%o7+%l2],%o7
/* 0x00e0           */             ld            [%o4+%i2],%o4
/* 0x00e4           */             ld            [%o5+%l1],%o5
/* 0x00e8           */             add           %o4,%o7,%o4
/* 0x00ec           */             add           %o4,%o5,%o4
/* 0x00f0           */             sra           %o4,16,%o4
/* 0x00f4           */             stb           %o4,[%i5]
```

APPENDIX A-continued

| | | | |
|---|---|---|---|
| !spill local registers that we need to use | | | |
| | stx | %l1,[%sp+248] | |
| !initialize loop-lives | | | |
| | wr | %g0,0x80,%asi | /* assume loop doesn't alter %asi so only */ |
| | | | /* need to set it once */ |
| | | | /* can actually set this in main( ) */ |
| | add | %i0,-2,%i0 | /* dec loop index so we can perform earlier */ |
| | | | /* inc in loop */ |
| | stxa | %i0,[%sp+192]%asi | /* %m1, actual is [%g0+96] */ |
| | stxa | %i1,[%sp+200]%asi | /* %m2, actual is */ |
| | | | /* [%g0+104] */ |
| !copy %sp to m0 | | | |
| | stxa | %sp,[%sp+184]%asi | /* actual is [%g0+88] */ |
| !copy loop live-ins to stack | | | |
| | stx | %i0,[%sp+272] | |
| | stx | %i1,[%sp+280] | |
| | stx | %i2,[%sp+288] | |
| | stx | %i3,[%sp+296] | |
| | stx | %i4,[%sp+304] | |
| | stx | %i5,[%sp+312] | |
| | stx | %o0,[%sp+320] | |
| | /*stx | %l1,[%sp+328]*/ | |
| | stx | %l2,[%sp+336] | |
| | stx | %l5,[%sp+344] | |
| | stx | %l6,[%sp+352] | |
| | mov | 0x186, %l1 | /* initialize busy bits */ |
| | | | /* m1 used as loop index, m7 always used */ |
| | stxa | %l1,[%sp+96]%asi | /* (actual is [%g0+0]) */ |
| !fork speculative threads | | | |
| | set | .LMT1,%l1 | |
| | stxa | %l1,[%sp+160]%asi | /* set ASI_USER_THREAD_START_PC */ |
| | | | /* (actual is [%g0+64]) */ |
| | mov | 0x3,%l1 | |
| | stuba | %l1,[%sp+169]%asi | /* set TH_EN (actual is [%g0+73]) */ |
| | stuba | %g0,[%sp+170]%asi | /* set NS_TID (actual is [%g0+74]) */ |
| | mov | 0x9,%l1 | |
| | stuba | %l1,[%sp+172]%asi | /* set TH_INT and INT_TID (actual is */ |
| | | | /* [%g0+76]) */ |
| | mov | 0x1,%l1 | |
| | ba | .L900000214 | |
| | stuba | %l1,[%sp+171]%asi | /* flush old speculative state */ |
| !copy loop-ins from stack | | | |
| | .LMT1: | | |
| | ldxa | [%sp+184]%asi,%sp | |
| | ldx | [%sp+272],%i0 | |
| | ldx | [%sp+280],%i1 | |
| | ldx | [%sp+288],%i2 | |
| | ldx | [%sp+296],%i3 | |
| | ldx | [%sp+304],%i4 | |
| | ldx | [%sp+312],%i5 | |
| | ldx | [%sp+320],%o0 | |
| | /*ldx | [%sp+328],%l1*/ | |
| | ldx | [%sp+336],%l2 | |
| | ldx | [%sp+344],%l5 | |
| | ldx | [%sp+352],%l6 | |
| | mov | 0x86,%l1 | /* initialize busy bits */ |
| | | | /* m1 and m2 are loop-lives, m7 always used */ |
| | stxa | %l1,[%sp+96]%asi | /* (actual is [%g0+0]) */ |
| | mov | 0x1,%l1 | |
| | stuba | %l1,[%sp+171]%asi | /* flush old speculative state */ |
| | .L900000214: | | |
| | ldxa | [%sp+200]%asi,%i1 | /* read m2 (actual is [%g0+104]) */ |
| | ldxa | [%sp+192]%asi,%i0 | /* read m1 (actual is [%g0+96]) */ |
| /* 0x00f8 139 */ | ldub | [%i1],%o1 | |
| /* 0x00fc 142 */ | add | %i1,6,%i1 | |
| | stxa | %i1,[%sp+200]%asi | /* write m2 (actual is [%go+104]) */ |
| /* 0x0100 140 */ | ldub | [%i1-5],%o5 | |
| | add | %i0,2,%i0 | /* increment loop index early */ |
| /* 0x0104 141 */ | ldub | [%i1-4],%o4 | |
| /* 0x0108 151 */ | sll | %o1,2,%o1 | |
| | stxa | %i0,[%sp+192]%asi | /* write m1 (actual is [%g0+96]) */ |
| /* 0x010c */ | sll | %o5,2,%o5 | |
| /* 0x0110 */ | add | %o0,%o1,%o1 | |
| | ldx | [%sp+248],%l1 | /* restore scratch register */ |

APPENDIX A-continued

| | | | | |
|---|---|---|---|---|
| /* 0x0114 | | */ | sll | %o4,2,%o4 |
| /* 0x0118 | | */ | add | %o0,%o5,%o5 |
| /* 0x011c | | */ | ld | [%o1],%o7 |
| /* 0x0120 | | */ | add | %o0,%o4,%o4 |
| /* 0x0124 | | */ | ld | [%o5+1024],%g2 |
| /* 0x0128 | | */ | ld | [%o4+2048],%g1 |
| /* 0x012c | | */ | add | %o7,%g2,%o7 |
| /* 0x0130 | | */ | add | %o7,%g1,%o7 |
| /* 0x0134 | | */ | sra | %o7,16,%o7 |
| /* 0x0138 | | */ | stb | %o7,[%i3+%i0] |
| /* 0x013c | 155 | */ | ld | [%o5+%l5],%g2 |
| /* 0x0140 | | */ | ld | [%o1+3072],%o7 |
| /* 0x0144 | | */ | ld | [%o4+%i2],%g1 |
| /* 0x0148 | | */ | add | %o7,%g2,%o7 |
| /* 0x014c | | */ | add | %o7,%g1,%o7 |
| /* 0x0150 | | */ | sra | %o7,16,%o7 |
| /* 0x0154 | | */ | stb | %o7,[%i4+%i0] |
| /* 0x0158 | 159 | */ | ld | [%o5+%l2],%o5 |
| /* 0x015c | | */ | ld | [%o1+%i2],%o1 |
| /* 0x0160 | | */ | ld | [%o4+%l1],%o4 |
| /* 0x0164 | | */ | add | %o1,%o5,%o1 |
| /* 0x0168 | | */ | add | %o1,%o4,%o1 |
| /* 0x016c | | */ | sra | %o1,16,%o4 |
| /* 0x0170 | | */ | add | %i0,1,%o1 |
| /* 0x0174 | | */ | stb | %o4,[%i5+%i0] |
| /* 0x0178 | 139 | */ | ldub | [%i1-3],%i0 |
| /* 0x017c | 140 | */ | ldub | [%i1-2],%o5 |
| /* 0x0180 | 141 | */ | ldub | [%i1-1],%o4 |
| /* 0x0184 | 151 | */ | sll | %i0,2,%i0 |
| /* 0x0188 | | */ | sll | %o5,2,%o5 |
| /* 0x018c | | */ | add | %o0,%i0,%i0 |
| /* 0x0190 | | */ | sll | %o4,2,%o4 |
| /* 0x0194 | | */ | add | %o0,%o5,%o5 |
| /* 0x0198 | | */ | ld | [%i0],%o7 |
| /* 0x019c | | */ | add | %o0,%o4,%o4 |
| /* 0x01a0 | | */ | ld | [%o5+1024],%g2 |
| /* 0x01a4 | | */ | ld | [%o4+2048],%g1 |
| /* 0x01a8 | | */ | add | %o7,%g2,%o7 |
| /* 0x01ac | | */ | add | %o7,%g1,%o7 |
| /* 0x01b0 | | */ | sra | %o7,16,%o7 |
| /* 0x01b4 | | */ | stb | %o7,[%i3+%o1] |
| /* 0x01b8 | 155 | */ | ld | [%o5+%l5],%g2 |
| /* 0x01bc | | */ | ld | [%i0+3072],%o7 |
| /* 0x01c0 | | */ | ld | [%o4+%i2],%g1 |
| /* 0x01c4 | | */ | add | %o7,%g2,%o7 |
| /* 0x01c8 | | */ | add | %o7,%g1,%o7 |
| /* 0x01cc | | */ | sra | %o7,16,%o7 |
| /* 0x01d0 | | */ | stb | %o7,[%i4+%o1] |
| /* 0x01d4 | 159 | */ | ld | [%o5+%l2],%o5 |
| /* 0x01d8 | | */ | ld | [%i0+%i2],%i0 |
| /* 0x01dc | | */ | ld | [%o4+%l1],%o4 |
| /* 0x01e0 | | */ | add | %i0,%o5,%i0 |
| | | | stx | %l1,[%sp+248]    /* spill scratch register */ |
| /* 0x01e4 | | */ | add | %i0,%o4,%i0 |
| | | | ldxa | [%sp+240]%asi,    /* read m7 (actual is [%g0+144]) */ |
| | | | | %g0 |
| | | | | /* will block unless thread is non-spec */ |
| /* 0x01e8 | | */ | sra | %i0,16,%o4 |
| /* 0x01ec | | */ | add | %o1,1,%i0 |
| /* 0x01f0 | | */ | cmp | %i0,%l6 |
| /* 0x01f4 | | */ | /*bcs,pt | %icc, |
| | | | | .L900000214*/ |
| | | | bcc,pn | %icc,.LMT5 |
| /* 0x01f8 | | */ | stb | %o4,[%i5+%o1] |
| ! | should also release stores here | | | |
| | | | mov | 0x86,%l1 |
| | | | stxa | %l1,[%sp+96]%asi    /* reset busy bits */ |
| | | | mov | 0x2,%l1 |
| | | | ba | .L900000214 |
| | | | stuba | %l1,[%sp+170]%asi    /* toggle NS_TID */ |

APPENDIX A-continued

```
                    .LMT5:
!                   check if this is the master thread
                                        lduba       [%sp+170]%asi,%l1    /* NS_TID == 0? */
                                        cmp         %l1,1                /* actual is cmp %l1,0 */
                                                                         /* need this change because we cannot */
                                                                         /* do NS_TID toggling */
                                                                         /* when generating this trace */
                                                                         /* from profiling, we know this loop is */
                                                                         /* always executed */
                                                                         /* even #iterations => this branch */
                                                                         /* should fall through */
                                        be          .LMT7:
                                        ldx         [%sp+248],%l1        /* restore scratch register */
                                        stx         %i0,[%sp+272]        /* save live-outs to stack */
                                        stx         %i1,[%sp+280]        /* maybe should just copy modified live */
                                                                         /* outs */
                                        stx         %i2,[%sp+288]
                                        stx         %i3,[%sp+296]
                                        stx         %i5,[%sp+304]
                                        stx         %o0,[%sp+312]
                                        stx         %o2,[%sp+320]
                                        stx         %l0,[%sp+328]
                                        stx         %l1,[%sp+336]
                                        stx         %l3,[%sp+344]
                                        stx         %l5,[%sp+352]
                                        set         .LMT6,%l1            /* set ASI_USER_THREAD_START_
                                                                         PC */
                                        stxa        %l1,[%sp+160]%asi
                                        mov         0x8,%l1              /* set INT_TID = 0 and TH_INT = 1 */
                                        stuba       %l1,[%sp+172]%asi
                    .LMT6:
                                        mov         0x1,%l1              /* disable other threads except T0 */
                                        stuba       %l1,[%sp+169]%asi
                                        ldx         [%sp+272],%i0        /* load live-outs from stack */
                                        ldx         [%sp+280],%i1
                                        ldx         [%sp+288],%i2
                                        ldx         [%sp+296],%i3
                                        ldx         [%sp+304],%i5
                                        ldx         [%sp+312],%o0
                                        ldx         [%sp+320],%o2
                                        ldx         [%sp+328],%l0
                                        ldx         [%sp+336],%l1
                                        ldx         [%sp+344],%l3
                                /*      ldx         [%sp+248],%l1*/      /* restore scratch register */
                                                                         /* not needed because it happened to be */
                                                                         /* a live-out */
                                        ba          .L900000217
                                        ldx         [%sp+352],%l5
                    .LMT7:
                                        mov         0x1,%l1
                                        stuba       %l1,[%sp+169]%asi    /* disable other threads except T0 */
                                        ldx         [%sp+248],%l1        /* restore scratch register */
                    .L900000217:
/* 0x01fc           159     */          cmp         %i0,%l0
/* 0x0200                   */          bcc,pt      &icc,.L77000157
/* 0x0204                   */          or          %g0,%i0,%o1
                    .L77000144:
/* 0x0208           139     */          ldub        [%i1],%i0
                    .L900000219:
/* 0x020c           140     */          ldub        [%i1+1],%o4
/* 0x0210           151     */          sll         %i0,2,%i0
/* 0x0214           141     */          ldub        [%i1+2],%l6
/* 0x0218           151     */          add         %o0,%i0,%i0
/* 0x021c           142     */          add         %i1,3,%i1
/* 0x0220           151     */          sll         %o4,2,%o4
/* 0x0224                   */          ld          [%i0],%o5
/* 0x0228                   */          sll         %l6,2,%l6
/* 0x022c                   */          add         %o0,%o4,%o4
/* 0x0230                   */          ld          [%o4+1024],%g1
/* 0x0234                   */          add         %o0,%l6,%l6
/* 0x0238                   */          ld          [%l6+2048],%o7
/* 0x023c                   */          add         %o5,%g1,%o5
/* 0x0240                   */          add         %o5,%o7,%o5
/* 0x0244                   */          sra         %o5,16,%o5
/* 0x0248                   */          stb         %o5,[%i3+%o1]
/* 0x024c           155     */          ld          [%o4+%l5],%g1
/* 0x0250                   */          ld          [%i0+3072],%o5
/* 0x0254                   */          ld          [%l6+%i2],%o7
/* 0x0258                   */          add         %o5,%g1,%o5
```

APPENDIX A-continued

| | | | | |
|---|---|---|---|---|
| /* 0x025c | | */ | add | %o5,%o7,%o5 |
| /* 0x0260 | | */ | sra | %o5,16,%o5 |
| /* 0x0264 | | */ | stb | %o5,[%i4+%o1] |
| /* 0x0268 | 159 | */ | ld | [%i0+%i2],%i0 |
| /* 0x026c | | */ | ld | [%o4+%l2],%o4 |
| /* 0x0270 | | */ | ld | [%l6+%l1],%l6 |
| /* 0x0274 | | */ | add | %i0,%o4,%i0 |
| /* 0x0278 | | */ | add | %i0,%l6,%i0 |
| /* 0x027c | | */ | sra | %i0,16,%i0 |
| /* 0x0280 | | */ | stb | %i0,[%i5+%o1] |
| /* 0x0284 | | */ | add | %o1,1,%o1 |
| /* 0x0288 | | */ | cmp | %o1,%l0 |
| /* 0x028c | | */ | bcs,a,pt | %icc,.L900000219 |
| /* 0x0290 | | */ | ldub | [%i1],%i0 |
| .L77000157: | | | | |
| /* 0x0294 | | */ | subcc | %l3,1,l3 |
| /* 0x0298 | | */ | bpos,a,pt | %icc,.L900000218 |
| /* 0x029c | | */ | ld | [%o2],%g2 |
| .L77000149: | | | | |
| /* 0x02a0 | | */ | ret | |
| /* 0x02a4 | | */ | restore | %g0,%g0,%g0 |
| /* 0x02a8 | 0 | */ | .type | rgb_ycc_convert,2 |
| /* 0x02a8 | | */ | .size | rgb_ycc_convert,(.-rgb_ycc_convert) |

What is claimed is:

1. In a computer system having a processor capable of executing a plurality of N threads of instructions, N being an integer greater than one, comprising:
   a set of K global registers, wherein a register is a global register if it is visible to each of the plurality of N threads of instructions, K being an integer;
   a plurality of K by N busy bit memory elements, each N elements corresponding to one of the set of K global registers;
   processor logic to set busy bit memory elements for global registers that are used in more than one of the plurality of N threads of instructions;
   processor logic to stall a read from global register if a thread of the plurality of N threads of instructions reading that global register is a speculative thread and at least one busy bit for a prior thread and for that global register is set; and
   processor logic to clear a busy bit for a thread of the plurality of N threads of instructions and a global register of the set of K global registers when the thread writes the corresponding global register.

2. The computer system of claim 1, wherein N is two.

3. The computer system of claim 1, wherein K is eight.

* * * * *